(12) United States Patent
Wakamori

(10) Patent No.: US 7,965,328 B2
(45) Date of Patent: Jun. 21, 2011

(54) CMOS SOLID-STATE IMAGE PICKUP APPARATUS UTILIZING SELECTABLE ACCUMULATION TIME RESULTS

(75) Inventor: Yasuo Wakamori, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 490 days.

(21) Appl. No.: 12/079,293

(22) Filed: Mar. 26, 2008

(65) Prior Publication Data

US 2008/0239126 A1    Oct. 2, 2008

(30) Foreign Application Priority Data

Mar. 29, 2007 (JP) ................. 2007-087398

(51) Int. Cl.
*H04N 3/14*  (2006.01)
(52) U.S. Cl. ............................................ 348/308
(58) Field of Classification Search ............ 348/308
See application file for complete search history.

(56) References Cited

U.S. PATENT DOCUMENTS

| | | | | |
|---|---|---|---|---|
| 5,965,871 A | * | 10/1999 | Zhou et al. | 250/208.1 |
| 7,234,641 B2 | * | 6/2007 | Olmstead | 235/454 |
| 2002/0015534 A1 | * | 2/2002 | Hachiya et al. | 382/266 |
| 2004/0080645 A1 | * | 4/2004 | Shinohara | 348/301 |
| 2004/0239791 A1 | | 12/2004 | Mabuchi | |
| 2006/0157760 A1 | | 7/2006 | Hayashi et al. | |

FOREIGN PATENT DOCUMENTS

| | | |
|---|---|---|
| JP | 2003018471 | 1/2003 |
| JP | 2006191236 | 7/2006 |

* cited by examiner

*Primary Examiner* — Jason Chan
*Assistant Examiner* — Usman Khan
(74) *Attorney, Agent, or Firm* — Pillsbury Winthrop Shaw Pittman LLP

(57) ABSTRACT

Basically, en electronic shutter function of a CMOS solid-state image pickup apparatus is implemented by a rolling shutter of which exposure timing sequentially shifts between pixel rows. The exposure period for one pixel row is from a time point when readout of the pixel row is started to a time point when next readout of the pixel row is started. Thus, in order to achieve exposure similar to that of a global shutter with the same exposure period applied to all of the pixel rows, there is set a blank period where no pixel signal is read out from any one of the pixel rows, and an LED is illuminated over a predetermined portion within the blank period. In this way, the CMOS solid-state image pickup apparatus having a rolling shutter function can achieve similar exposure to a global shutter.

4 Claims, 11 Drawing Sheets

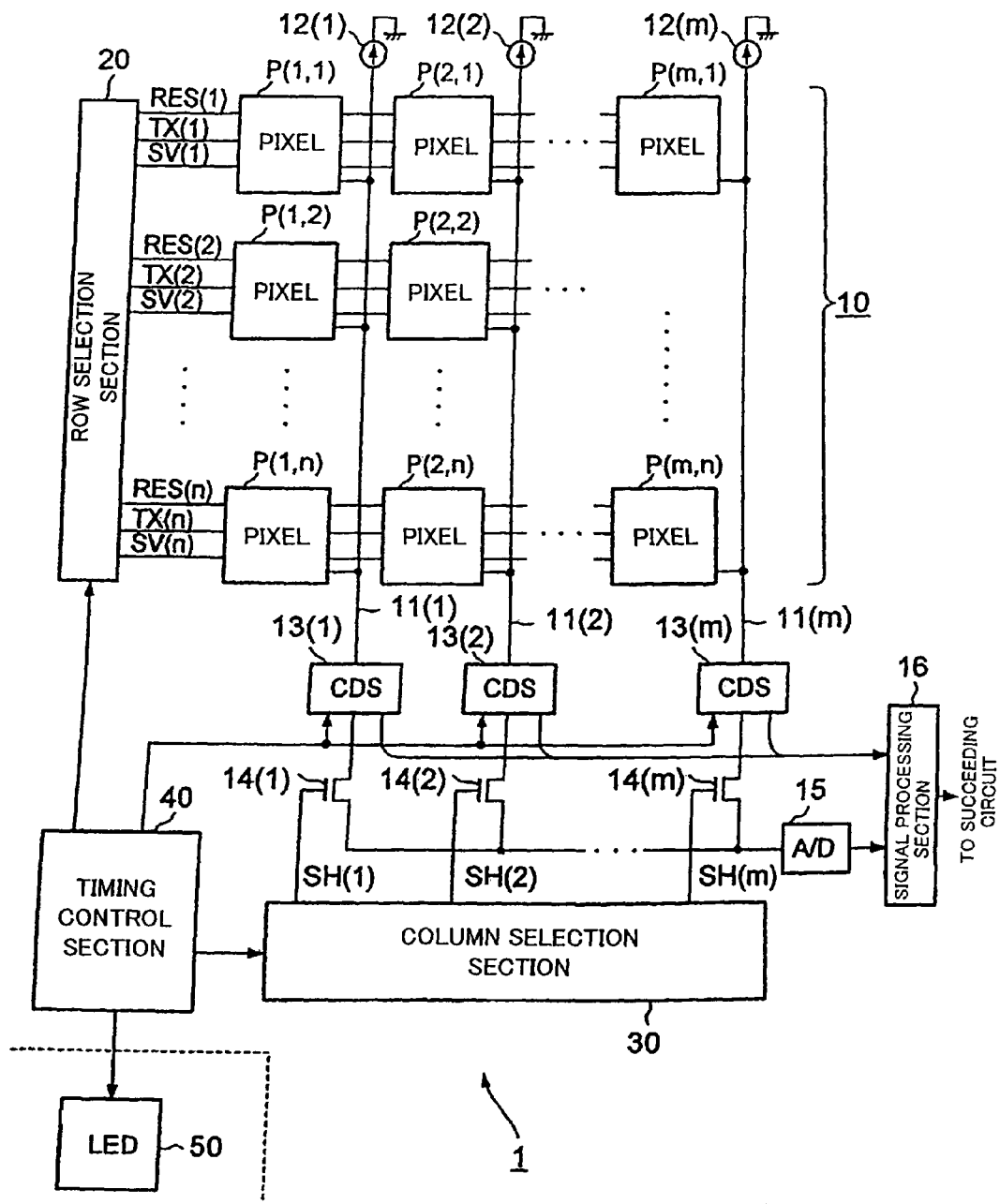
F I G. 1

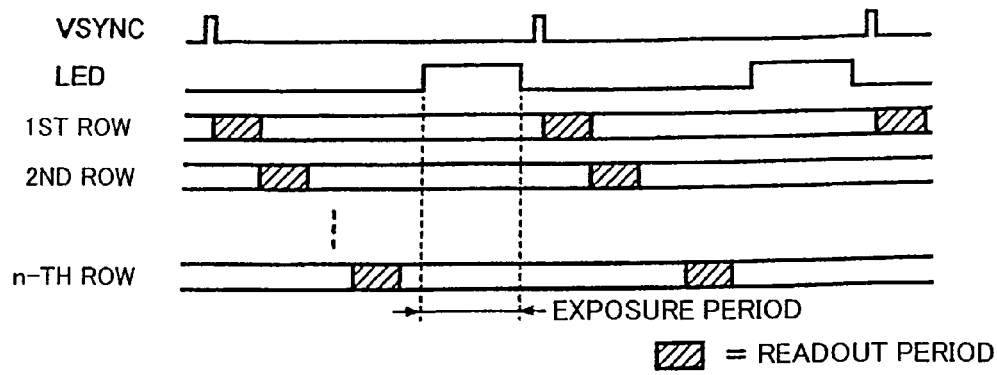
F I G. 4
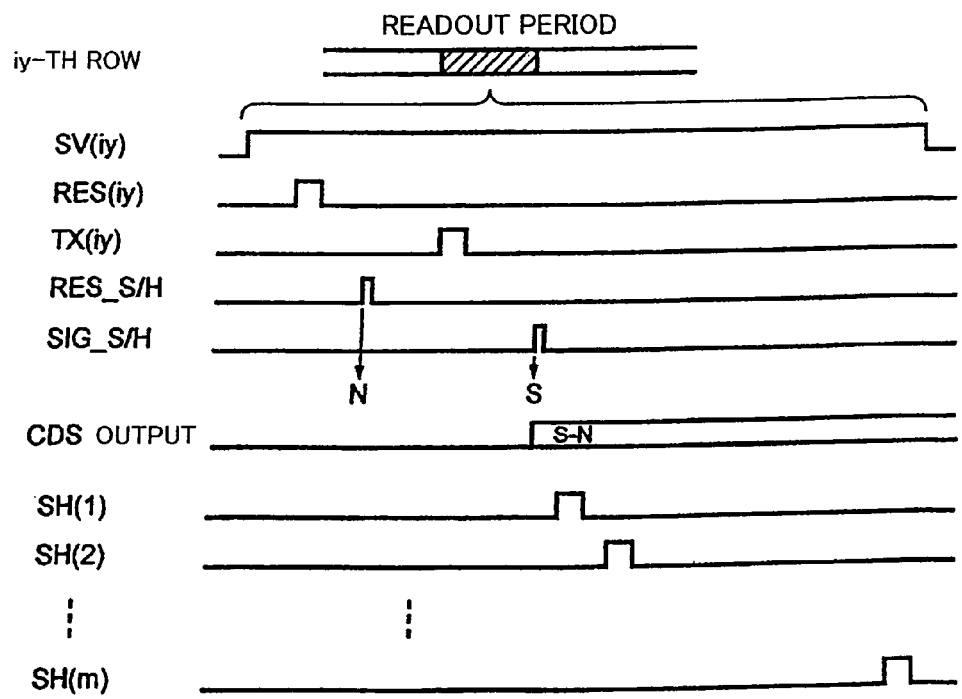
F I G. 5

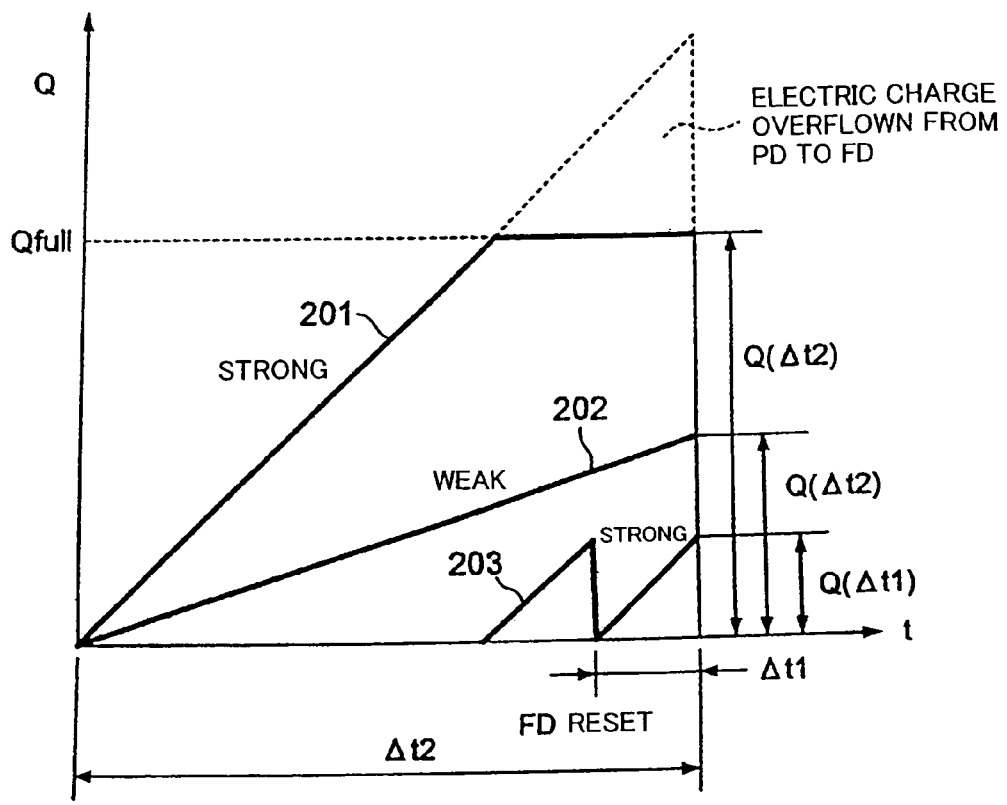
F I G. 11

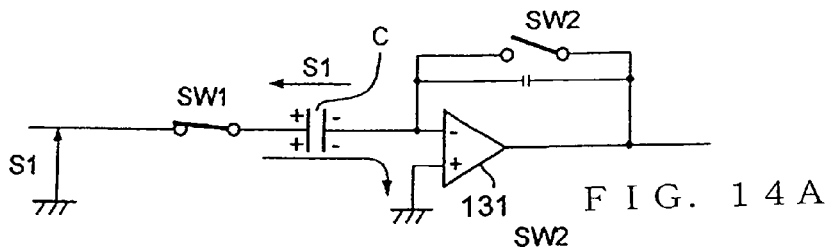
F I G. 1 4 A
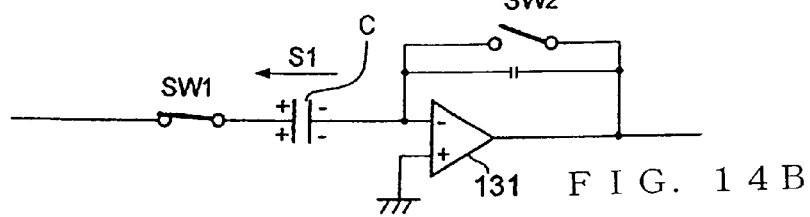
F I G. 1 4 B
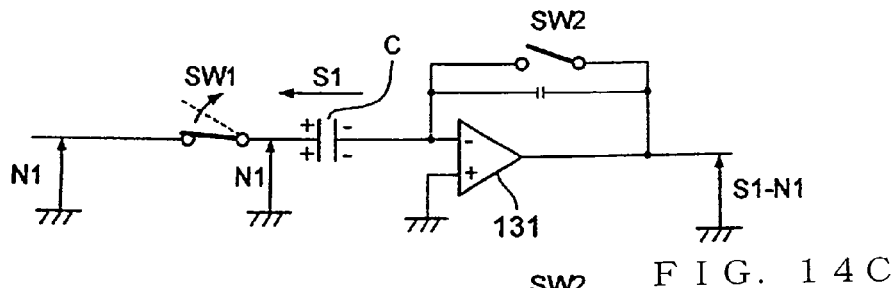
F I G. 1 4 C
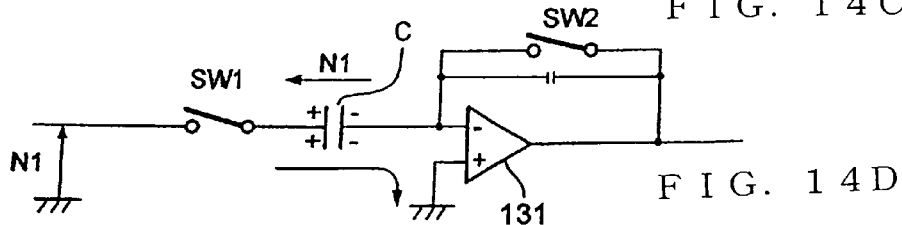
F I G. 1 4 D
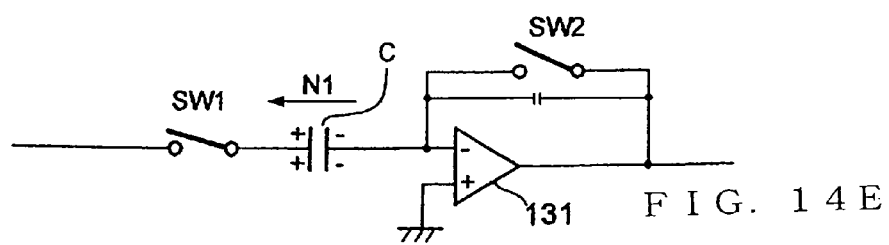
F I G. 1 4 E
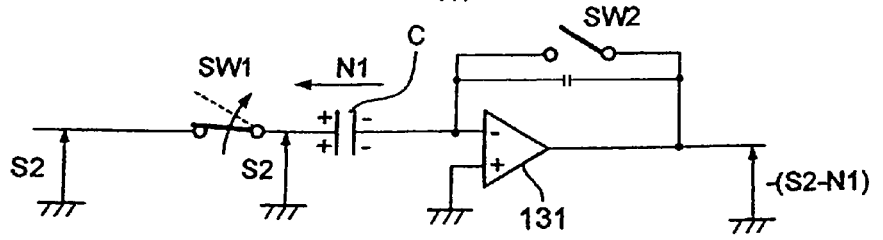
F I G. 1 4 F

CMOS SOLID-STATE IMAGE PICKUP APPARATUS UTILIZING SELECTABLE ACCUMULATION TIME RESULTS

BACKGROUND

The present invention relates amplification-type CMOS solid-state image pickup apparatus which amplify electric charges obtained by photoelectric conversion elements provided in a plurality of arrayed pixels and output amplified electric charges as electric signals.

In recent years, there have been widely used image pickup apparatus, such as digital still cameras and digital video cameras, which can pick up an image by means of a solid-state image sensing device and store the picked-up image as digital data. Formerly, CCD (Charged Coupled Device) solid-state image pickup apparatus were the most common type of solid-state image pickup apparatus. In recent years, however, CMOS (Complementary Metal Oxide Semiconductor) solid-state image pickup apparatus have been attracting a lot of attention (see for example Japanese Patent No. 3,827,145) because the demand for an increased number of pixels is getting stronger and stronger. Many of the CMOS solid-state image pickup apparatus have an electronic shutter function. Unlike the shutter function of the CCD solid-state image pickup apparatus, the electronic shutter function of the CMOS solid-state image pickup apparatus is implemented by a so-called "rolling shutter" or "focal plane shutter", which outputs signals by sequentially scanning a multiplicity of two-dimensionally arrayed pixels on a row-by-row basis. Thus, with the conventionally-known CMOS solid-state image pickup apparatus, the exposure period (timing) sequentially shifts row by row, so that, in imaging a moving object, the image of the moving object would be undesirably distorted. To avoid this problem, various techniques have been proposed which allow the CMOS solid-state image pickup apparatus to have a "global shutter function" for exposing all of the pixel rows during the common or same exposure period. For example, in a CMOS solid-state image pickup apparatus disclosed in Japanese Patent Application Laid-open Publication No. 2006-191236, exposure of photoelectric conversion elements in the form of photodiodes is started with a transfer transistor and reset transistor, provided per pixel, placed in an ON state and with a stored (or accumulated) electric charge and potential of a floating diffusion layer of each of the photodiodes placed in a reset state. After the passage of a predetermined exposure period, the disclosed CMOS solid-state image pickup apparatus closes a mechanical shutter to terminate the exposure period and then sequentially reads out, from the floating diffusion layers, voltages corresponding to electric charges transferred from the photodiodes on the row-by-row basis.

However, if the mechanical shutter is provided for the global shutter function as disclosed in the No. 2006-191236 publication, the CMOS solid-state image pickup apparatus would be undesirably complicated in mechanical construction and hence become expensive.

SUMMARY OF THE INVENTION

In view of the foregoing, it is an object of the present invention to provide an improved CMOS solid-state image pickup apparatus which can expose all pixel rows during the same exposure period and thereby image a moving object appropriately without distortion, in generally the same manner as a global shutter, even without a particular global shutter mechanism being provided therein.

In order to accomplish the above-mentioned object, the present invention provides an improved CMOS solid-state image pickup apparatus, which comprises: a pixel matrix section including a plurality of pixels disposed in row and column arrays; a pixel signal processing section that processes a pixel signal read out from each of the pixels of the pixel matrix section; and, a timing control section that periodically repeats timing control for reading out the pixel signals of one screen from individual ones of the pixels of the pixel matrix section and that provides a blank period, where no pixel signal is read out, from the end of pixel signal readout of one screen to the start of pixel signal readout of a next screen, the timing control section outputting a control signal for illuminating a light source over a given portion within the blank period.

With the present invention thus constructed, all of the pixels of the pixel matrix section are exposed to light during the same illumination period of the light source, and thus, a moving object can be imaged appropriately without distortion even without a particular global shutter mechanism being provided in the apparatus.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 1 is a circuit diagram showing an example construction of a CMOS solid-state image pickup apparatus according to an embodiment of the present invention;

FIG. 4 is a time chart explanatory of behavior of the embodiment of the CMOS solid-state image pickup apparatus in a normal mode;

FIG. 5 is a time chart explanatory of behavior of the embodiment of the CMOS solid-state image pickup apparatus during readout of pixel signals in an iy-th row in the normal mode;

FIG. 11 is a diagram showing signal charges amount accumulated in a PD and FD of a pixel during the illumination of the LED in the second wide dynamic range mode;

FIGS. 14A-14F are diagrams explanatory of behavior of the CDS circuit.

DETAILED DESCRIPTION

Construction of Embodiment

Figure 2:
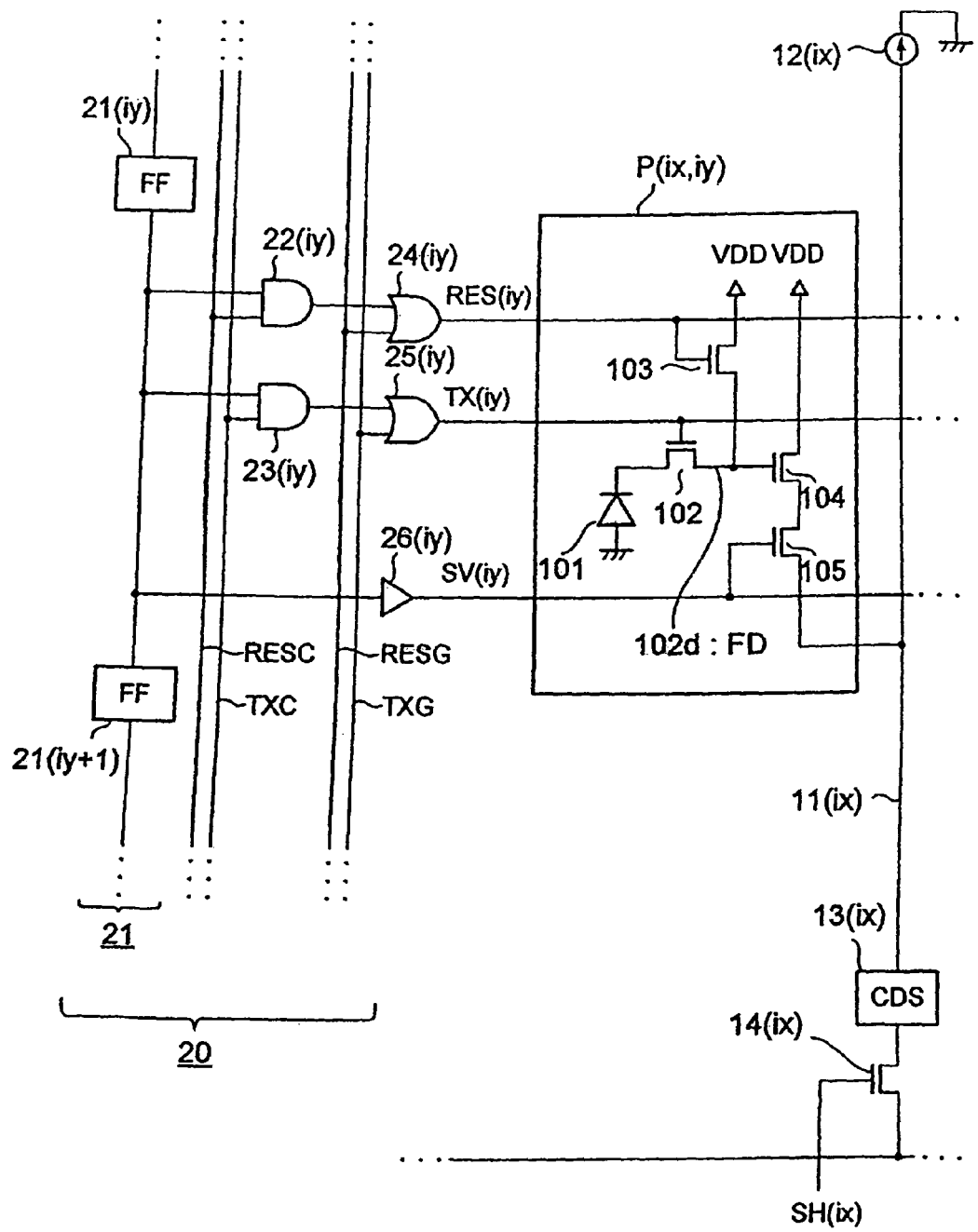
FIG. 2 is a circuit diagram showing not only example constructions of one of pixels and a portion of a row selection section corresponding to the pixel but also connections between the pixel, constant current source, CDS circuit and switch.

FIG. 1 is a circuit diagram showing an example construction of a CMOS solid-state image pickup apparatus 1 according to an embodiment of the present invention. This CMOS solid-state image pickup apparatus 1 comprises circuitry fabricated on a semiconductor substrate by a CMOS fabrication process as shown in FIG. 1. Although not particularly shown, the CMOS solid-state image pickup apparatus 1 also includes circuitry for performing an image quality adjustment process on digital pixel signals obtained by a signal processing section 16 shown in FIG. 1.

In FIG. 1, a pixel matrix section 10 comprises a matrix of (m×n) pixels P(ix, iy) (ix=1-m, iy=1-n) each outputting a pixel signal corresponding to an amount of light received thereby (i.e., received light amount of the pixel). The pixel matrix section 10 includes m column signal lines 11(ix) (ix=1-m) corresponding to the pixel columns. n pixels P belonging to the ix-th pixel column (ix, iy) (iy=1-n) each output a pixel signal to the same column signal line 11(ix). Constant current sources 12(ix) (ix=1-m), which are loads of respective transistors (to be later described) within the pixels P(ix, iy) (ix=1-m, iy=1-n), are inserted between the column signal lines 11(ix) (ix=1-m) and grounding wires. Further, CDS (Correlated Double Sampling) circuits 13(ix) (ix=1-m) are connected to corresponding ones of the column signal lines 11(ix) (ix=1-m). The CDS circuits 13(ix) (ix=1-m) each perform a process for removing, from a signal level, a reference level included in each pixel signal output to a corresponding one of the column signal lines 11(ix)(ix=1-m). Pixel signals output from the CDS circuits 13(ix) (ix=1-m) are given to an A/D converter 15, via corresponding switches 14(ix) (ix=1-m) each in the form of a MOS transistor, and converted by the A/D converter 15 into digital pixel signals. The signal processing section 16 cooperates with the CDS circuits 13(ix) (ix=1-m) to perform various signal processing on the digital pixel signals, such as signal processing corresponding to a later-described first or second wide dynamic range mode, and the signal processing section 16 supplies the resultant processed signals to a succeeding circuit. Namely, the signal processing section 16 and the CDS circuits 13(ix) (ix=1-m) together constitute a pixel signal processing unit for processing the pixel signals read out from the pixels P(ix, iy) (ix=1-m, iy=1-n).

The instant embodiment of the CMOS solid-state image pickup apparatus 1 has operation modes including a normal mode and first and second wide dynamic range modes. The first and second wide dynamic range modes are operation modes for obtaining pixel signals having respective received light amounts of the pixels P(ix, iy) (iy=1-n) accurately reflected therein, even in a situation where intensity of light received by the pixels P(ix, iy) (iy=1-n) considerably differs among the pixels P(ix, iy) and overflow may occur in FDs or PDs (to be later described) of some of the pixels P(ix, iy) which have received strong light. When the CMOS solid-state image pickup apparatus 1 is in the first or second wide dynamic range mode, the CDS circuits 13(ix) (ix=1-m) make a predetermined determination pertaining to the pixel signals and outputs determination result signals indicative of the results of the determination. By reference to the determination result signals, the signal processing section 16 performs signal processing, corresponding to the first or second wide dynamic range mode, on the digital pixel signals output from the A/D converter 15. Details of the first and second wide dynamic range modes will be later discussed.

Row selection section 20 and column selection section 30 are circuits that generate various control signals for reading out pixel signals of one screen from the pixel matrix section 10 under control of a timing control section 40. More specifically, each time the timing control section 40 generates a vertical synchronization signal VSNC on a periodical basis, the row selection section 20 sequentially outputs row selection signals SV(iy) instructing selection of the individual rows (iy=iy-n) of the pixel matrix section 10. Also, while outputting the row selection signals SV(iy), the row selection section 20 outputs reset signals RES (iy) and transfer instruction signals TX(iy) necessary to read out pixel signals of m pixels P(ix, iy) (ix=1-m) of the iy-th row. The column selection section 30 sequentially outputs switch control signals SH(ix) (ix=1-m) for turning on the switches 14(ix) (ix=1-m) each time pixel signals of one row are output from the pixels P(ix, iy) (iy=1-n) to the column signal lines 11(ix) (ix=1-m) and the pixel signals of one row, each having a reset voltage removed therefrom, are output from the CDS circuits 13(ix) (ix=1-m).

The timing control section 40 repetitively performs timing control to generate a periodic vertical synchronization signal VSYNC and causes the row selection section 20 and column selection section 30 to generate, in response to (or by being triggered by) the vertical synchronization signal VSYNC, control signals necessary to read out pixel signals of one screen as noted above. Also, the timing control section 40 sets or provides a blank period, in which no pixel signal is read out, from the end of pixel signal readout of one screen to the start of pixel signal readout of a next screen, and it outputs a control signal to illuminate an LED 50, provided as a light source, over a predetermined portion within the blank period. During that time, the timing control section 40 output a control signal such that the LED 50 is illuminated in response to the vertical synchronization signal VSYNC. Further, when the CMOS solid-state image pickup apparatus 1 is in any one of the first and second wide dynamic range modes, the timing control section 40 causes the row selection section 20 to output transfer instruction signals TX(iy) (iy=1-n) simultaneously to all of the rows or output reset signals (iy) (iy=1-n) simultaneously to all of the rows.

FIG. 2 is a circuit diagram showing not only example constructions of one of the pixels P(ix, iy) and a portion of the row selection section 20 corresponding to the pixel P(ix, iy) but also connections between the pixel P(ix, iy), constant current source 12(ix), CDS circuit 13(ix) and switch 14(ix).

As shown in FIG. 2, the row selection section 20 includes a vertical shift register 21 comprising n flip-flops 21(iy) (iy=1–n). The vertical shift register 21 sequentially shifts an imaging instruction pulse, generated by the timing control section 40 at the time of the generation of the vertical synchronization signal VSYNC, through the n flip-flops 21(iy) in response to shift clocks of a predetermined frequency.

As shown in FIG. 2, each of the flip-flops 21(iy) (iy=1–n) has its output terminal connected with a circuit including AND gates 22(iy) and 23(iy), OR gates 24(iy) and 25(iy) and non-inverting buffer 26(iy). This circuit is constructed to generate a row selection signal SV(iy) to the m pixels P(ix, iy) (ix=1–m) of the iy-th row (iy=1–n) on the basis of the output signal of the iy-th flip-flop 21 (iy).

More specifically, the non-inverting buffer 26(iy) outputs the output signal of the flip-flop 21(iy) directly as the row selection signal SV(iy). The AND gate 22(iy) allows a reset pulse RESC to pass therethrough when the output signal of the flip-flop 21(iy) is at an H (high) level. The AND gate 23(iy) allows a transfer instruction pulse TXC to pass therethrough when the output signal of the flip-flop 21(iy) is at the H (high) level. Here, the reset pulse RESC and transfer instruction pulse TXC are pulses that are output from the timing control section 40 and have the same frequency as the shift clock given to the vertical shift register 21. The reset pulse RESC is generated at timing slightly later than the rising edge of the shift clock, and the transfer instruction pulse TXC is generated at timing slightly later than the reset pulse RESC. The OR gate 24(iy) outputs the rest pulse RESC, having passed through the AND gate 22(iy), as a reset signal RES(iy) to be given to the pixel P(ix, iy) of the iy-th row. The OR gate 25(iy) outputs the transfer instruction pulse TXC, having passed through the AND gate 23(iy), as a transfer instruction signal TX(iy) to be given to the pixel P(ix, iy) of the iy-th row.

When the first wide dynamic range mode is selected, the timing control section 40 generates an all-row-pixel collective transfer pulse TXG immediately following the start of illumination of the LED 50. In this case, the OR gate 25(iy) in each of the rows outputs the all-row-pixel collective transfer pulse TXG as a transfer instruction signal TX(iy) to be given to the pixels P (ix, iy) (ix=1–m) of the iy-th row. Further, when the second wide dynamic range mode is selected, the timing control section 40 generates an all-row-pixel collective reset pulse RESG immediately preceding the deillumination of the LED 50. In this case, the OR gate 24(iy) in each of the rows outputs the all-row-pixel collective reset pulse RESG as a reset signal RES(iy) to be given to each of the pixels P (ix, iy) (ix=1–m) of the iy-th row.

As shown in the figure, each of the pixels P(ix, iy) comprises a PD (photodiode) 101, a transfer transistor 102 in the form of a MOS transistor, a reset transistor 103, an amplification transistor 104, and a row selection transistor 105.

Figure 3:
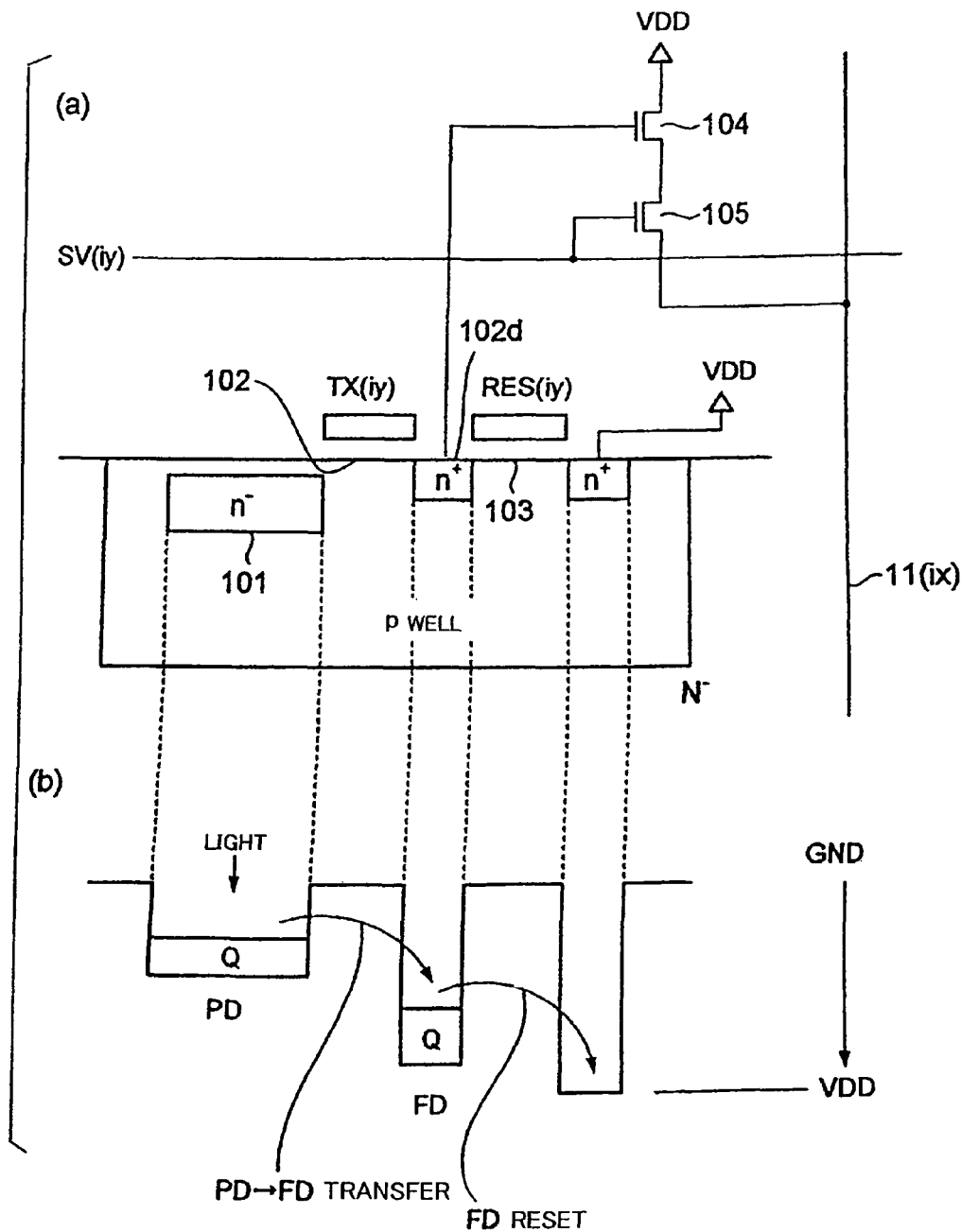
FIG. 3 shows various elements of the pixel fabricated on a semiconductor substrate, a part (a) thereof is a sectional view schematically showing various elements of the pixel fabricated on a semiconductor substrate, and a part (b) thereof is a diagram showing potentials at various elements of the pixel and electric charge transfer within the pixel.

(a) of FIG. 3 schematically shows the above-mentioned various elements of the pixel P(ix, iy) fabricated on the semiconductor substrate, and (b) of FIG. 3 shows potentials at various portions of the pixel P(ix, iy) and shows how electric charge is transferred in the pixel P(ix, iy). Note that, in (a) of FIG. 3, the amplification transistor 104 and row selection transistor 105 are indicated in circuit symbols (without their sectional structures being indicated) to avoid complexity of the illustration.

As shown in (a) of FIG. 3, each of the elements of the pixel P(ix, iy) is formed on a P-well (i.e., isolated region having low-concentrated N-type impurities doped therein) formed in the N-type semiconductor substrate. The PD 101 is a photoelectric conversion element comprising a layer formed by embedding low-concentrated N-type impurities in a P-well, which generates signal charge Q corresponding to an amount of light received. The transfer transistor 102 has a source connected to the PD 101, and a drain in the form of an FD (floating diffusion) layer 102d. Once a transfer instruction signal TX(iy) is given to the gate of the transfer transistor 102, a channel extending from the PD 101 to the FD 102d is formed, and the signal charge Q accumulated in the PD 101 is transferred to the FD 102d via this channel. The reset transistor 103 is turned on once a reset signal RES(iy) is supplied to the gate of the transistor 102, so that the potential of the FD 102d is reset by being connected to a power supply VDD.

The amplification transistor 104 has a drain connected to the power supply VDD, a gate connected to the FD 102d and a source connected via the row selection transistor 105 to the corresponding column signal line 11(ix). The row selection transistor 105 is turned on once the row selection signal SV(iy) given to the gate of the row selection transistor 105 turns to the High level, so that the source of the amplification transistor 104 is connected to the constant current source 12(ix) via the corresponding column signal line 11(ix). In this state, the amplification transistor 104 functions, together with the row selection transistor 105 and constant current source 12(ix), as a source-follower amplification circuit that outputs to the corresponding column signal line 11(ix) a pixel signal indicative of the potential of the FD 102d.

Behavior of the Embodiment

The following paragraphs describe behavior of the aforementioned embodiment.

Behavior in Normal Mode

The instant embodiment of the CMOS solid-state image pickup apparatus 1 is suitably used to image a moving object in a factory's production line or the like. At that time, the imaging is carried out with areas around the CMOS solid-state image pickup apparatus 1 and the moving object kept darkened.

FIG. 4 is a time chart explanatory of behavior of the CMOS solid-state image pickup apparatus 1. In generating the above-mentioned periodic vertical synchronization signal VSYNC, the timing control section 40 gives an imaging instruction pulse to the vertical shift register 21 of the row selection section 20. The row selection section 20 sequentially shifts the imaging instruction pulse through the flip-flops in response to the shift clocks. Thus, pixel signals are sequentially read out for each of the first to n-th lines of the pixel matrix section 10; for example, pixel signals are read out from the pixels P(ix, 1) (ix=1–m) of the first row in the pixel matrix section 10 once the output signal from the first-stage flip-flop 21(1) turns to the H level, pixel signals are read out from the pixels P(ix, 2) (ix=1–m) of the second row in the pixel matrix section 10 once the output signal from the second-stage flip-flop 21(2) turns to the H level, and so on. In the instant embodiment, there is set a blank period, in which no pixel signal is read out, from the end of the pixel signal readout of one screen to the start of the pixel signal readout of a next screen, and the timing control section 40 outputs a control signal to illuminate the LED 50 over a predetermined portion within the blank period, as noted above.

Because the CMOS solid-state image pickup apparatus 1 is used with the areas around it and the moving object kept in a darkened state, output light from the LED 50 is reflected off the object to be imaged only during the illumination of the LED 50 (i.e., period over which the LED 50 is kept illuminated, and such reflected light is input to (or impinges on) the PD 101 of each of the pixels P(ix, iy) (ix=1–m, iy=1–n). Such an illumination period of the LED 50 is equivalent to an exposure period of all of the pixels P(ix, iy) (ix=1–m, iy=1–n).

FIG. 5 is a time chart explanatory of behavior of the CMOS solid-state image pickup apparatus 1 during readout of pixel signals of the pixels P(ix, iy) (ix=1–m) of the iy-th row. Once the row selection signal SV(iy) turns to the H level in response to the shift of the imaging instruction pulse by the vertical shift register 21, pixel signals of the pixels P(ix, iy) (ix=1–m) of the iy-th row are read out in the following manner.

Once the row selection signal SV(iy) turns to the H level, as shown in FIG. 5, the timing control section 40 sequentially generates a reset pulse RESC and transfer instruction pulse TXC. First, the reset pulse RESC passes through the AND gate 22(iy) and OR gate 24(iy) of the row selection section 20 and is supplied to the reset transistor 103 of each of the pixels P(ix, iy) (ix=1–m). In this way, the FD 102d of each of the pixels P(ix, iy) (ix=1–m) is connected to the power supply VDD and brought to a reset state where no electric charge is accumulated therein.

Next, the transfer instruction pulse TXC passes through the AND gate 23(iy) and OR gate 25(iy) of the row selection section 20 and is supplied, as a transfer instruction signal TX(iy), to the transfer transistor 102 of each of the pixels P(ix, iy) (ix=1–m). In this way, signal charge having been accumulated in the PD 101 is transferred to the FD 102d via the transfer transistor 102.

During a time period from the generation of the reset signal RES(iy) to the generation of the transfer instruction signal TX(iy), the timing control section 40 sends a sample-and-hold instruction signal RES_S/H to the CDS circuits 13 (ix) (ix=1–m), so that each of the CDS circuits 13 (ix) (ix=1–m) receives, from the corresponding column signal line 11(ix), reset voltages N corresponding to a voltage of the FD 102d of the pixels P(ix, iy) (ix=1–m) in the reset state and samples and holds the received reset voltages N.

After the generation of the transfer instruction signal TX(iy), the timing control section 40 sends a sample-and-hold instruction signal SIG_S/H to the CDS circuits 13 (ix) (ix=1–m). In response to the sample-and-hold instruction signal SIG_S/H, each of the CDS circuits 13 (ix) (ix=1–m) receives, from the corresponding column signal line 11(ix), a signal voltage S corresponding to a voltage of the FD 102d of each of the pixels P(ix, iy) (ix=1–m) where the signal charge has been transferred from the PD 101 after being reset, and samples and holds the received signal voltage S. Then, each of the CDS circuits 13 (ix) (ix=1–m) subtracts a reset voltage N from the signal voltage S and outputs the result of the subtraction as a pixel signal indicative of an amount of light received during the exposure period of the pixel P.

After that, the timing control section 40 causes the row selection section 30 to sequentially output column selection signals SH(ix) (ix=1–m). Thus, the pixel signals output from the individual CDS circuits 13(ix) (ix=1–m) are sequentially selected by the switched 14(ix) (ix=1–m) and supplied to the A/D converter 15 for conversion into digital pixel signals.

Behavior in the First Wide Dynamic Range Mode

Figure 6:
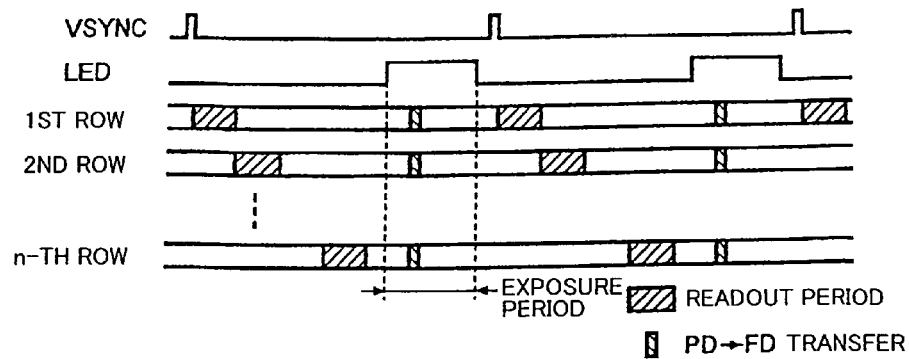
FIG. 6 is a time chart explanatory of behavior of the embodiment of CMOS solid-state image pickup apparatus in a first wide dynamic range mode.
Figure 7:
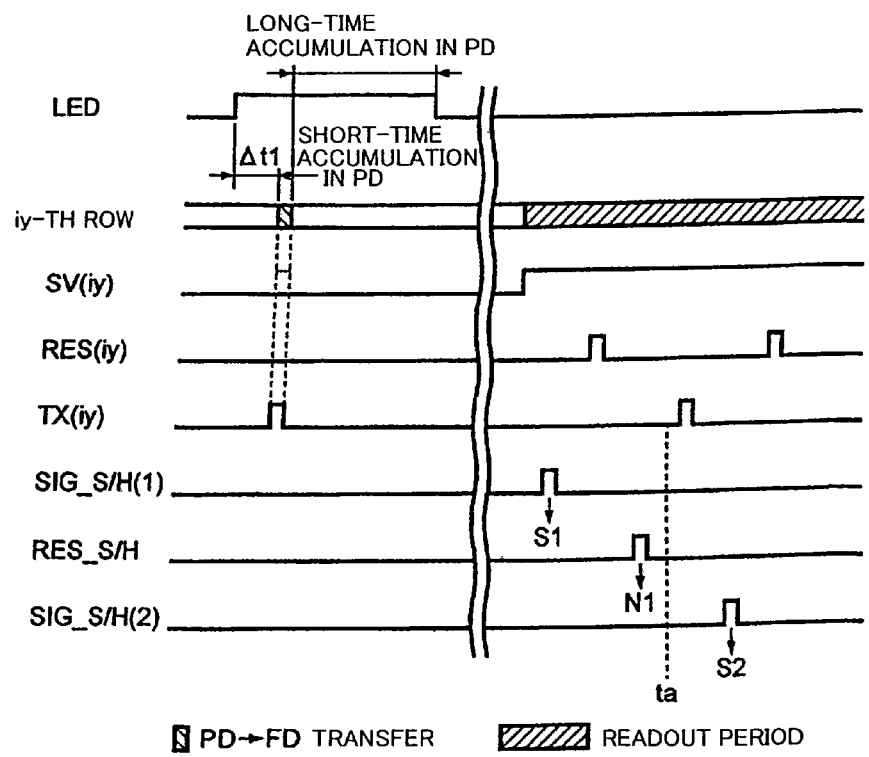
FIG. 7 is a time chart showing details of the behavior of the CMOS solid-state image pickup apparatus in the first wide dynamic range mode, which particularly shows behavior during illumination of an LED and during readout of the pixels of the iy-th row.
Figure 8:
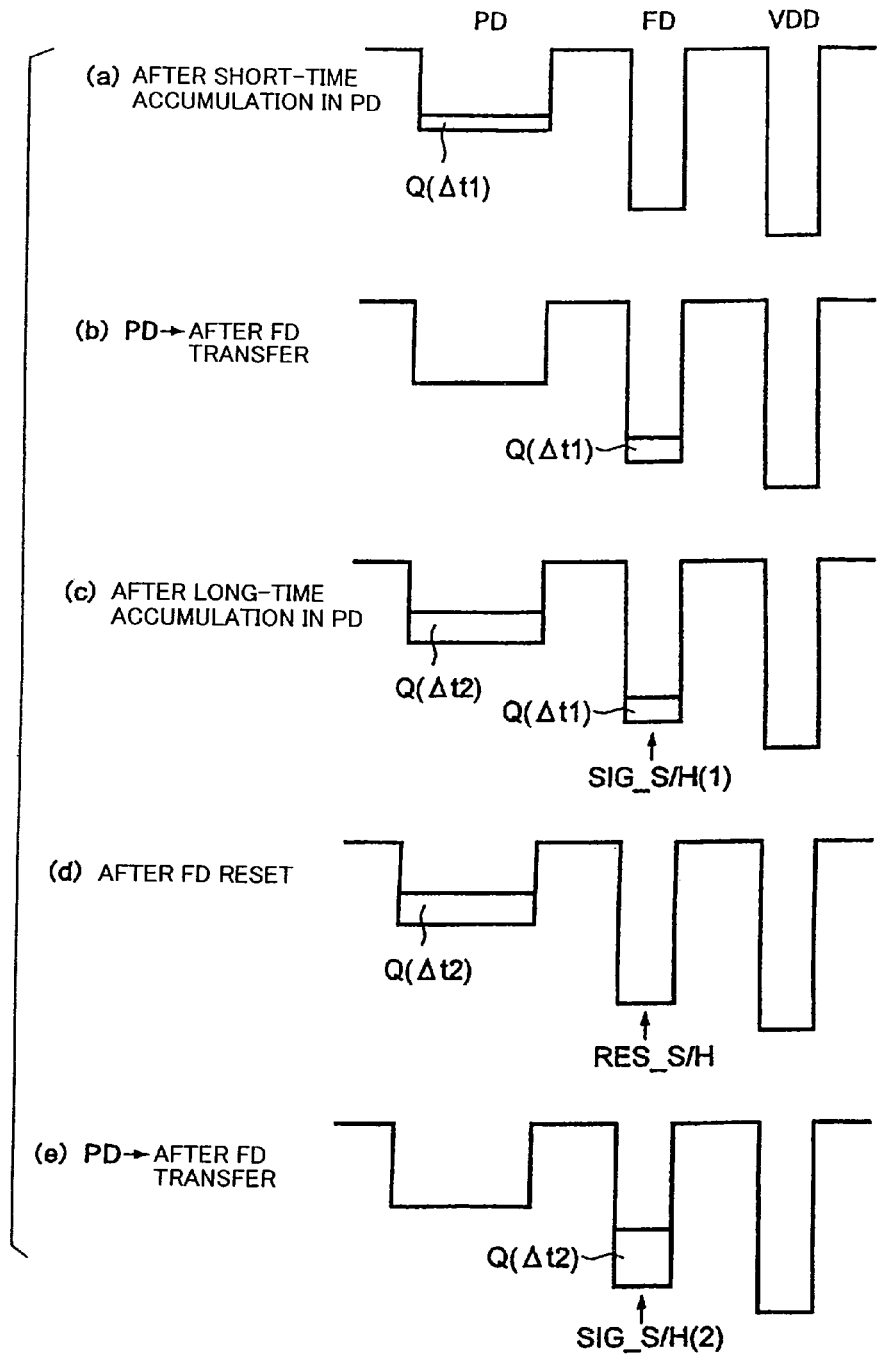
FIG. 8 is a diagram showing how electric charge is generated and transferred in the pixel in the first wide dynamic range mode.

The first wide dynamic range mode is an operation mode for obtaining pixel signals having respective received light amounts of the pixels P(ix, iy) (ix=1–m, iy=1–n) accurately reflected therein, even in a situation where intensity of light received by the pixels P(ix, iy) (ix=1–m, iy=1–n) considerably differs among the pixels P(ix, iy) and overflow may occur in the FDs 102d of some of the pixels P(ix, iy) which have received strong light. FIG. 6 is a time chart explanatory of behavior of the CMOS solid-state image pickup apparatus 1 when the first wide dynamic range mode is set as the operation mode. FIG. 7 is a time chart showing details of behavior of the CMOS solid-state image pickup apparatus 1 during illumination of the LED 50 and during readout of the pixels P(ix, iy) (ix=1–m) of the iy-th row in the behavior shown in FIG. 6. Further, FIG. 8 is a diagram showing how electric charge is generated and transferred in the pixel P(ix, iy) in the first wide dynamic range mode.

In the first wide dynamic range mode, the timing control section 40, at a time point within the illumination period of the LED 50 immediately following the illumination start, causes the electric charge to be transferred from the PD 101 to the FD 102d in all of the pixels P(ix, iy) (ix=1–m, iy=1–n). More specifically, at the time point within the illumination period of the LED 50 immediately following the illumination start, the timing control section 40 generates an all-row-pixel collective transfer pulse TXG of a short pulse width, to cause the row selection section 20 to output transfer instruction signals TX (iy) (iy=1–n) to all of the rows.

Here, a time period from the illumination start of the LED 50 to the rise of the transfer instruction signals TX (iy) (iy=1–n) is indicated by "$\Delta t1$". Signal charge $Q(\Delta t1)$ corresponding to an amount of light received is then generated and accumulated in the PD 101 of each of the pixels P(ix, iy) (ix=1–m, iy=1–n) for the period $\Delta t1$ (see "short-time accumulation in PD" shown in FIG. 7 and see (a) of FIG. 8). Then, in each of the pixels P(ix, iy) (ix=1–m, iy=1–n), the signal charge $Q(\Delta t1)$ in the PD 101 is transferred to the FD 102d in response to the rising edge of the transfer instruction signals TX (iy) (see (b) of FIG. 8).

Also, a time period from the fall of the transfer instruction signals TX (iy) (iy=1–n) to deillumination of the LED 50 is indicated by "$\Delta t2$". Signal charge $Q(\Delta t2)$ corresponding to an amount of light received is then generated and accumulated in the PD 101 of each of the pixels P(ix, iy) (ix=1–m, iy=1–n) (see "long-time accumulation in PD" shown in FIG. 7 and see (c) of FIG. 8). By this time, the charge $Q(\Delta t1)$ in the PD 101 generated and transferred in "short-time accumulation in PD" has been accumulated in the FD 102d of each of the pixels P(ix, iy) (ix=1–m, iy=1–n).

After that, readout of the pixel signals of one screen is started, and then, once the row selection signal SV(iy) turns to the H level so that the readout period for the pixel signals (ix, iy) (ix=1–m) of the iy-th row is reached, the following operations are performed.

First, the timing control section 40 sends a sample-and-hold instruction signal SIG_S/H(1) to the CDS circuits (ix) (ix=1–m). Thus, each of the CDS circuits 13 (ix) (ix=1–m) samples and holds a signal voltage S1 corresponding to a voltage currently output to the corresponding signal line 11(ix), i.e. signal charges $Q(\Delta t1)$ generated by the "short-time accumulation in PD" and transferred to the respective FDs 102d in the pixels P(ix, iy) (ix=1–m) (see (c) of FIG. 8).

Then, the timing control section 40 sends a reset pulse RESC to the row selection section 20 to cause the selection section 20 to output a reset signal RES (iy) to each of the pixels P(ix, iy) (ix=1–m). Thus, the FD 102d in each of the pixels P(ix, iy) (ix=1–m) is rest by being connected to the power supply VDD via the reset transistor 103 (see (d) of FIG. 8). Consequently, a voltage N1 corresponding to a voltage of the reset FD 102d in each of the pixels (ix, iy) (ix=1–m) is output to the corresponding column signal line 11(ix). By this time point, electric charge $Q(\Delta t2)$ generated by the "long-time accumulation in PD" has been accumulated in the PD 101 of each of the pixels (ix, iy) (ix=1–m) (see (d) of FIG. 8).

Then, the timing control section 40 sends a sample-and-hold instruction signal RES_S/H to the CDS circuits 13 (ix) (ix=1–m), so that each of the CDS circuits 13 (ix) (ix=1–m) samples and holds a voltage currently output to the corresponding column signal line 11(ix) the reset voltage N1 corresponding to the voltage of the reset FD 102d in each of the pixels reset voltage pixels P(ix, iy) (ix=1–m) in the reset state and sample and hold the received reset voltages N (see (d) of FIG. 8). Then, each of the CDS circuits 13(ix) (ix=1–m) subtracts the current sampled-and-held reset voltage N1 from the signal voltage S1 sampled and held previously and outputs a pixel signal indicative of the result of the subtraction S1–N1.

Then, at a time point ta immediately following the output of the pixel signal S1–N1, each of the CDS circuits 13(ix) (ix=1–m) determines whether the pixel signal S1–N1 is greater than a predetermined threshold value. The predetermined threshold value is determined on the basis of a permissible value of the voltage accumulatable in the FD 102d, details of which will be later explained. If the pixel signal is greater than the predetermined threshold value, the CDS circuit 13 sets the pixel signal S1–N1 as an ultimate pixel signal and then ignores any sample-and-hold signal given until readout of pixel signals of a next screen is started. Also, the CDS circuit (ix) outputs a determination result signal indicating that the pixel signal S1–N1 has been determined as the ultimate signal.

Next, the timing control section 40 sends a transfer instruction pulse TXC to the row selection section 20 so that the selection section 20 outputs a transfer instruction signal TX(iy) to each of the pixels P(ix, iy) (ix=1–m). Thus, the electric charge Q(Δt2) accumulated by the "long-time accumulation in PD" in the PD 101 is transferred to the FD 102d in each of the pixels P(ix, iy) (ix=1–m) (see (e) of FIG. 8). Consequently, a signal voltage S2 indicative of the voltage accumulated in the FD 102d having accumulated the charge Q(Δt2) by the long-time accumulation is output to the corresponding column signal line 11(ix).

Then, the timing control section 40 sends a sample-and-hold instruction signal SIG_S/H(2) to each of the CDS circuits 13(ix) (ix=1–m). Each CDS circuit 13 (ix) having set the above-mentioned pixel signal S1–N1 as the ultimate pixel signal, ignores this sample-and-hold signal SIG_S/H(2), while each CDS circuit 13 (ix) having not set the above-mentioned pixel signal S1–N1 as the ultimate pixel signal, samples and holds the signal voltage S2 currently output to the column signal line 11(ix) and subtracts the reset signal S2, sampled and held earlier, from the signal voltage S2, sets, as the ultimate pixel signal, a pixel signal S1–N1 indicative of the result of the subtraction and then outputs a determination result signal indicating to that effect.

Next, the timing control section 40 sends a reset pulse RESC to the row selection section 20 to cause the selection section 20 to output a reset signal RES (iy) to each of the pixels P(ix, iy) (ix=1–m), so that the FD 102d in each of the pixels P(ix, iy) (ix=1–m) is rest. This is because, if the FD 102d is not reset and thus the electric charge is left in the FD 102d, this left electric charge will be added to electric charge generated by the "short-time accumulation in PD" when the electric charge generated by the "short-time accumulation in PD" is transferred from the PD 101 to the FD 102d.

The exposure period (i.e., illumination period of the LED 50) is the same for all of the pixels P(ix, iy) (ix=i–m, iy=1–n) in the instant embodiment, and thus, in the case where intensity of light impinging on the PDs 101 of the pixels P(ix, iy) (ix=1–m, iy=1–n) considerably differs among the pixels P(ix, iy), a relatively great amount of signal charge is accumulated in each PD 101 on which strong light has impinged, while a relatively small amount of signal charge is accumulated in each PD 101 on which weak light has impinged. It is necessary to increase the length of the exposure period, in order to obtain a pixel signal accurately indicative of an amount of the light impinging on each PD 101 on which weak light has impinged. However, if the length of the exposure period is increased like this, an extremely great amount of signal charge will be accumulated in each PD 101 on which strong light has impinged, and thus, when this signal charge has been transferred to the FD 102d, the voltage of the PD 102d, on which strong light has impinged, may overflow beyond the permissible value. In such a case, there can be obtained no pixel signal indicative of a received light amount of each PD 101 on which strong light has impinged; namely, there will be produced an image where regions of pixels exposed to the strong light are snow-white.

In the first dynamic range mode employed in the instant embodiment, such an inconvenience can be reliably avoided, and it is possible to obtain pixel signals accurately indicative of received light amounts both in a region of the pixel matrix section 10 where the pixels have been exposed to strong light and in a region of the pixel matrix section 10 where the pixels have been exposed to weak light, as will be set forth below.

First, if light received by the PD 101 during the illumination period of the LED 50 has a great intensity, a great electric charge Q(Δt1) is generated by the "short-time accumulation in PD", in proportion to which a great electric charge Q(Δt2) is generated by the "long-time accumulation in PD". Once the electric charge Q(Δt1) generated by the "short-time accumulation in PD" exceeds a given limit, there occurs overflow in the FD 102d when the electric charge Q(Δt2) generated by the "long-time accumulation in PD" is transferred from the PD 101 to the FD 102d.

Thus, in the first dynamic range mode, when each of the CDS circuit 13(ix) (ix=1–m) generates a pixel signal S1–N1 in response to the above-mentioned sample-and-hold instruction signal RES_S/H, it determines whether the pixel signal S1–N1 is greater than the threshold value, to thereby determine whether or not the FD 102 will overflow when the electric charge Q(Δt2) generated by the "long-time accumulation in PD" is transferred from the PD 101 to the FD 102d. To permit such a determination, the threshold value may be determined appropriately on the basis of the intensity of the electric charge Q(Δt2) that may overflow the FD 102d and a relationship between the electric charge Q(Δt2) and the pixel signal S1–N1. If the CDS circuit 13(ix) has determined that the FD 102 will overflow due to the transfer of the electric charge Q(Δt2), the pixel signal S1–N1 corresponding to the electric charge Q(Δt1) generated by the "short-time accumulation in PD" is set as the ultimate pixel signal. If, on the other hand, the CDS circuit 13(ix) has determined that the FD 102 will not overflow due to the transfer of the electric charge Q(Δt2), the pixel signal S2–N1 corresponding to the electric charge Q(Δt2) generated by the "long-time accumulation in PD" is set as the ultimate pixel signal.

The A/D converter 15 receives, via the switch 14(ix), each of the pixel signals determined as ultimate by the CDS circuits 13(ix) (ix=1–m), converts the received pixel signal into a digital pixel signal, and outputs the converted digital signal. The signal processing section 16 provided at a stage following the A/D converter 15 is supplied with each of the converted digital pixel signals corresponding to the pixels along with a determination result signal indicating whether the digital pixel signal corresponds to the electric charge Q(Δt1) generated by the "short-time accumulation in PD" or the electric charge Q(Δt2) generated by the "long-time accumulation in PD". In the signal processing section 16, a received light amount of a preceding one of successive digital pixel signals is adjusted to agree in scale with a succeeding one of the pixel signals, for example, by multiplying the preceding digital pixel signal with Δt2/Δt1, so that digital pixel signals having a wide dynamic range can be obtained in a screen as a whole.

Behavior in the Second Wide Dynamic Range Mode

Figure 9:
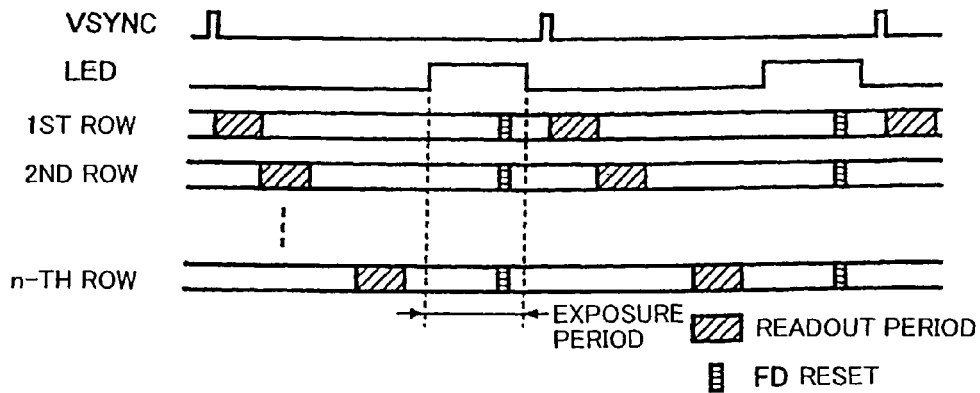
FIG. 9 is a time chart explanatory of behavior of the embodiment of CMOS solid-state image pickup apparatus in a second wide dynamic range mode.
Figure 10:
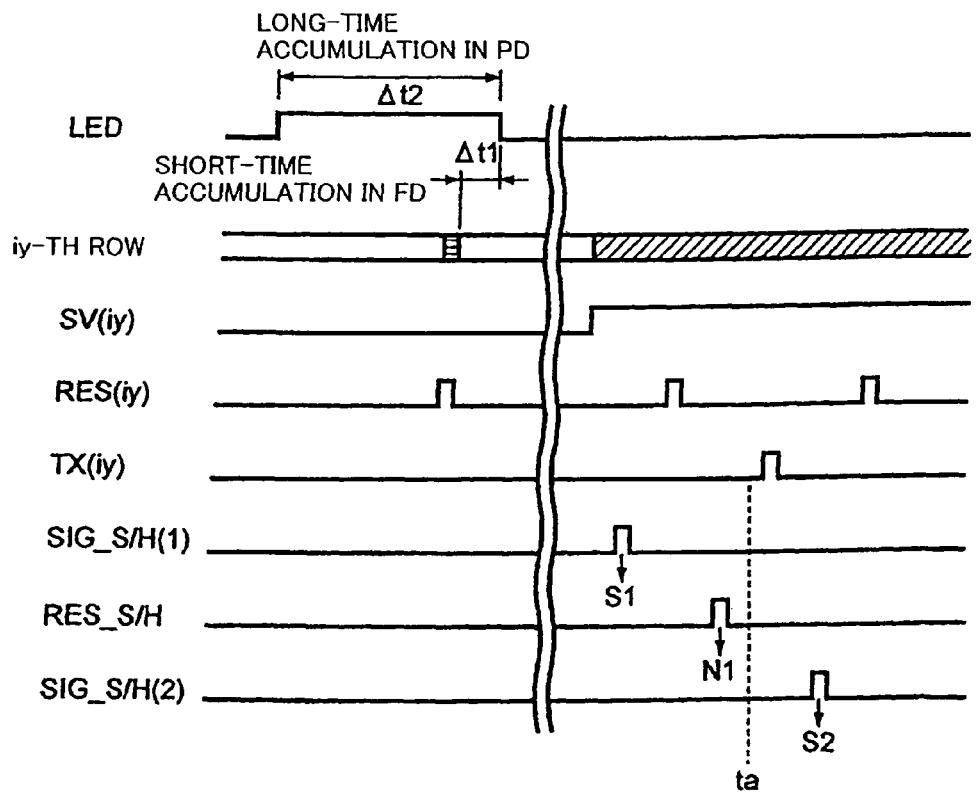
FIG. 10 is a time chart showing details of the behavior of the CMOS solid-state image pickup apparatus in the second wide dynamic range mode, which particularly shows behavior during illumination of the LED and during readout of the pixels of the iy-th row.

The second wide dynamic range mode is an operation mode for obtaining pixel signals having received light amounts of the pixels P(ix, iy) (ix =1–m, iy =1–n) accurately reflected therein, even in a situation where intensity of light received by the pixels P(ix, iy) (ix =1–m, iy =1– n) considerably differs among the pixels P(ix, iy) and overflow may occur in the PDs 101 of some of the pixels P(ix, iy) which have received strong light. FIG. 9 is a time chart explanatory of behavior of the CMOS solid-state image pickup apparatus 1 when the second wide dynamic range mode is set as the operation mode. FIG. 10 is a time chart showing details of behavior of the CMOS solid-state image pickup apparatus 1 during the illumination period of the LED 50 and during the readout period of the pixels P(ix, iy) (ix =1– m) of the iy-th row in the behavior shown in FIG. 9.

In the second wide dynamic range mode, the timing control section 40 does not cause transfer instruction signals TX(iy) (iy=1–n) to be generated during the illumination period of the LED 50 as it does in the first wide dynamic range mode. Instead, the timing control section 40 causes the PD 101 of each of the pixels P(ix, iy) (ix=1–m, iy=1–n) to generate and accumulate signal charge corresponding to an amount of light received thereby ("long-time accumulation in PD"). As shown in FIG. 9, the timing control section 40 causes the FD 102d of each of the pixels P(ix, iy) (ix=1–m, iy=1–n) to be reset at a time point within the illumination period of the LED 50 immediately preceding deillumination of the LED 50. More specifically, the timing control section 40, as shown in FIG. 9, generates an all-row-pixel collective reset pulse RESEG of a short pulse width at the time point immediately preceding the deillumination of the LED 50, to thereby cause the row selection section 20 to output reset signals RES(iy) (iy=i–n) to all of the rows (see FIG. 10). In the second wide dynamic range mode, timing for generating the reset signal RES(iy), transfer instruction signal TX(iy) and sample-and-hold instruction signals SIG_S/H(1), SIG_S/H and SIG_S/H (2) within the time period for pixel signal readout from each of the rows of the pixels P(ix, iy) (ix=1–m) is similar to that in the aforementioned first wide dynamic range mode (see FIGS. 10 and 7). Further, in the second wide dynamic range mode, the behavior of the CDS circuits 13(ix) (ix=1–m) responsive to the sample-and-hold instruction signals SIG_S/H(1), SIG_S/H and SIG_S/H(2) is similar to that in the first wide dynamic range mode.

Pixel state transition during the illumination period of the LED 50 differs between the pixels which have received strong light and the pixels which have received weak light. In FIG. 11, a line indicated by reference numeral 201 represents an amount of signal charge accumulated in the PD 101 of a given pixel P(ix, iy) having received strong light during the illumination period of the LED 50, and a line indicated by 202 represents an amount of signal charge accumulated in the PD 101 of a given pixel P(ix, iy) having received weak light during the illumination period of the LED 50. Further, a line indicated by 203 represents an amount of signal charge accumulated in the FD 102d of a given pixel P(ix, iy) having received strong light during the illumination period of the LED 50.

The PD 101 of each of the pixels P(ix) (ix=1–m, iy=1–y) can accumulate therein only a limited amount of signal charge, and it can not accumulate therein signal charge beyond a given permissible value Qfull. However, as indicated by the line 201, the pixel P(ix, iy) receives strong light during the illumination period of the LED 50, and a temporal gradient of signal charge generated by the PD 101 is so great that the amount of signal charge generated during the illumination period of the LED 50 is greater than (i.e., exceeds) the permissible value Qfull. In this case, the amount of charge accumulated in the PD 101 of the pixel P(ix, iy) saturates at the permissible value Qfull and signal charge newly generated following the saturation overflows from the PD 101 to the FD 102d, as indicated by the line 201, and the overflown signal charge is accumulated in the FD 102d as indicated by the line 203.

In the second wide dynamic range mode, reset signals RES (iy) (iy=1–n) are sent to all of the pixels P(ix, iy) (ix=1–m, iy=1–n) at the time point within the illumination period of the LED 50 immediately preceding the deillumination of the LED 50.

By the reset signals RES (iy) (iy=1–n), the electric charge overflown from the PD 101 and accumulated in the FD 102d in each pixel P(ix, iy) having received strong light is temporarily discharged, as indicated by the line 203. Then, once the reset signals RES (iy) (iy=1–n) fall, electric charge overflown from the PD 101 after the fall is accumulated in the FD 102d in each pixel P(ix, iy) having received strong light ("short-time accumulation in FD" shown in FIG. 10). At that time, the temporal gradient of the amount of electric charge overflowing from the PD 101 to the FD 102d is proportional to the received light amount of the PD 101. If a time period from the fall of the reset signals RES (iy) (iy=1–n) to the deillumination of the LED 50 is indicated by "Δt1", the electric charge Q(Δt1) having overflown from the PD 101 during the periodΔt1 is accumulated into the FD 102d during the deillumination of the LED 50. The electric charge Q(Δt1) accumulated in the FD 102d during the deillumination of the LED 50 has the received light amount of the pixel P(ix, iy) reflected therein.

In the example indicated by the line 202, on the other hand, the amount of signal charge generated by the PD 101 has a small temporal gradient because the pixel P(ix, iy) receives weak light during the illumination of the LED 50. Thus, the amount of signal charge generated during the illumination of the LED 50 falls at or below the permissible value Qfull, so that no electric charge overflows from the PD 101 to the FD 102d. If the illumination period of the LED 50 is indicated by "Δt2", electric charge Q(Δt2) corresponding to a cumulative received light amount of the pixel P(ix, iy) during the period Δt2 is accumulated into the PD 101 ("long-time accumulation in PD" shown in FIG. 10).

During the deillumination of the LED 50, as set forth above, the electric charge Q(Δt1) generated by the "short-time accumulation in FD" and having the received light amount reflected therein is accumulated in the FD 102d of each pixel P(ix, iy) which has received strong light and there has occurred electric charge overflow from the PD 101 to the FD 102d, while the electric charge Q(Δt2) generated by the "long-time accumulation in PD" and having the received light amount reflected therein is accumulated in the PD 101 of each pixel P(ix, iy) which has received weak light and there has occurred no electric charge overflow from the PD 101 to the FD 102d. Thus, in the second dynamic range mode, a pixel signal indicative of the electric charge Q(Δt1) generated by the "short-time accumulation in FD" is acquired for each pixel P(ix, iy) which has received strong light, while a pixel signal indicative of the electric charge Q(Δt2) generated by the "long-time accumulation in PD" is acquired for each pixel P(ix, iy) which has received weak light. In this way, pixel signals having a wide dynamic range in a screen as a whole can be acquired in the second dynamic range mode in accordance with an example operational sequence to be described below.

Once a sample-and-hold instruction signal SIG_S/H(1) is generated during the pixel signal readout period of the iy-th row shown in FIG. 10, each of the CDS circuits 13(ix) (ix=1−m) samples and holds a signal voltage S1 currently output to the corresponding column signal line 11(ix). Then, once a sample-and-hold instruction signal RES_S/H is generated following generation of a reset signal RES(iy), each of the CDS circuits 13(ix) (ix=1−m) samples and holds a reset voltage N1 currently output to the corresponding column signal line 11(ix), subtracts the reset voltage N1 from the signal voltage S1 sampled and held earlier, and generates a pixel signal S1−N1 indicative of the result of the subtraction. At that time, the CDS circuit 13(ix) determines whether the pixel signal S1−N1 is greater than (i.e., exceeds) a given threshold value.

Figure 12:
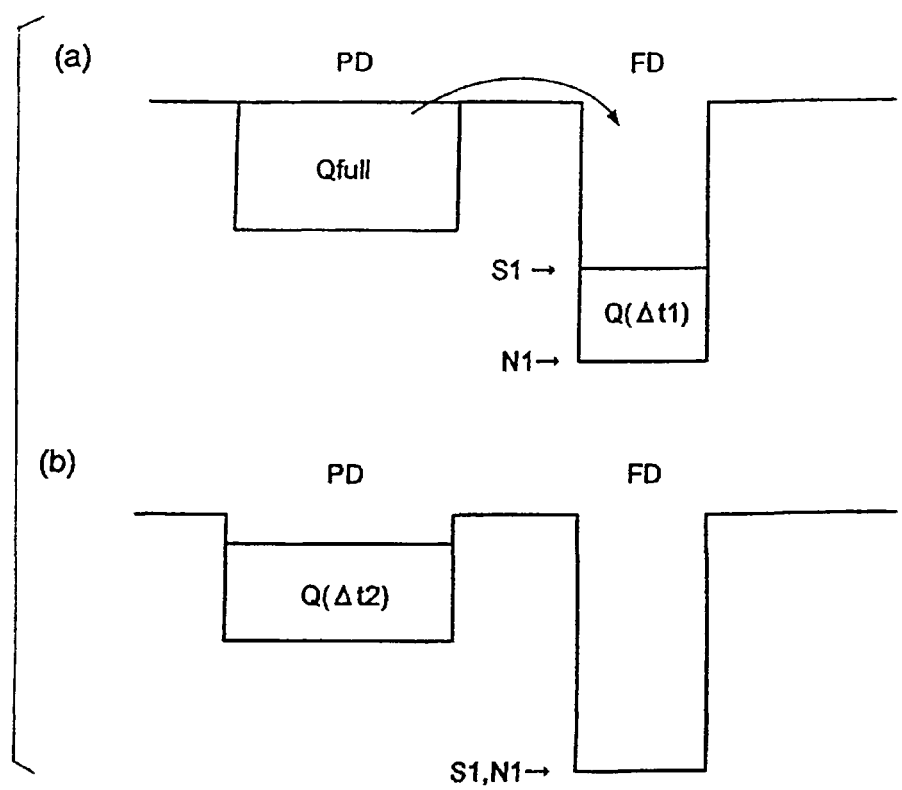
FIG. 12 is a diagram explanatory of a pixel-signal-related determination made by a CDS circuit in the second wide dynamic range mode.

If the pixel signal S1−N1 is greater than the given threshold value, the pixel signal S1−N1 is considered to represent the electric charge Q(Δt1) accumulated in the FD 102d by the "short-time accumulation in FD" after overflowing from the PD 101 as shown in (a) of FIG. 12. Thus, the CDS circuit 13(ix) having generated such a pixel signal S1−N1 sets the pixel signal S1−N1 as an ultimate pixel signal and outputs a determination result signal, indicating that the pixel signal S1−N1 has been set as the ultimate pixel signal, to the signal processing section 16. If, on the other hand, the pixel signal S1−N1 is not greater than the given threshold value, it is considered that the FD 102d is empty and the electric charge Q(Δt2) is currently accumulated in the PD 101 by the "long-time accumulation in PD". Thus, the CDS circuit 13(ix) having generated such a pixel signal S1−N1 samples and holds a signal voltage S2 currently output to the column signal line 11(ix) in response to a sample-and-hold instruction signal SIG_S/H(2) and subtracts a reset voltage N, sampled and held earlier, from the signal voltage S2 and outputs a pixel signal S2−N1 indicative of the electric charge Q(Δt2) generated by the "long-time accumulation in PD". Further, the CDS circuit 13(ix) outputs to the signal processing section 16 a determination signal indicating that the pixel signal S2−N1 indicative of the electric charge Q(Δt2) generated by the "long-time accumulation in PD" has been output as the ultimate pixel signal.

As in the aforementioned first wide dynamic range mode, the signal processing section 16 provided at the stage following the A/D converter 15 is supplied with each of the converted digital pixel signals corresponding to the pixels along with a determination result signal indicating whether the digital pixel signal corresponds to the electric charge Q(Δt1) generated by the "short-time accumulation in FD" or the electric charge Q(Δt2) generated by the "long-time accumulation in PD". In the signal processing section 16, a received light amount of a preceding one of successive digital pixel signals is adjusted to agree in scale with a succeeding one of the pixel signals, for example, by multiplying the preceding digital pixel signal with Δt2/Δt1, so that digital pixel signals having a wide dynamic range can be obtained in a screen as a whole.

Advantageous Result Achievable by the Embodiment

According to the preferred embodiment, as described above, there is set the blank period, in which no pixel signal is read out, from the end of the pixel signal readout of one screen to the start of the pixel signal readout of the next screen, and the LED 50 is illuminated within the blank period. Thus, even without a particular global shutter mechanism, the above-described embodiment can expose all of the pixels during the same exposure period and image a moving object with no distortion. Further, by the provision of the first and second wide dynamic range modes, the above-described embodiment permits, for each of the pixels, selective acquisition, depending on the intensity of light received by the pixel, an electric signal indicative of electric charge generated by the PD 101 in response to short-time light reception or an electric signal indicative of electric charge generated by the PD 101 in response to long-time light reception. As a result, the above-described embodiment can acquire pixel signals having the received light intensity of the corresponding pixels accurately reflected therein even in a situation where the received light intensity considerably differs among the pixels.

Other Embodiment

Although one preferred embodiment has been described above, various other embodiments or modifications are also possible as explained below.

(1) Whereas the preferred embodiment of the CMOS solid-state image pickup apparatus 1 has been described as having the normal mode and first and second wide dynamic range modes, the CMOS solid-state image pickup apparatus 1 may have only one or two of such operation modes.

(2) Arrangement may be made to allow the length of the illumination period of the LED 50 in any one of the operation mode and first and second wide dynamic range modes to be changed via setting operation performed from outside the CMOS solid-state image pickup apparatus 1, without changing the length of the blank period where no pixel signal is read out.

(3) Arrangement may be made to allow the duration of the "short-time accumulation in PD" to be changed in the first wide dynamic range mode via setting operation performed from outside the CMOS solid-state image pickup apparatus 1.

(4) Arrangement may be made to allow the duration of the "short-time accumulation in FD" to be changed in the second wide dynamic range mode via setting operation performed from outside the CMOS solid-state image pickup apparatus 1.

Figure 13:
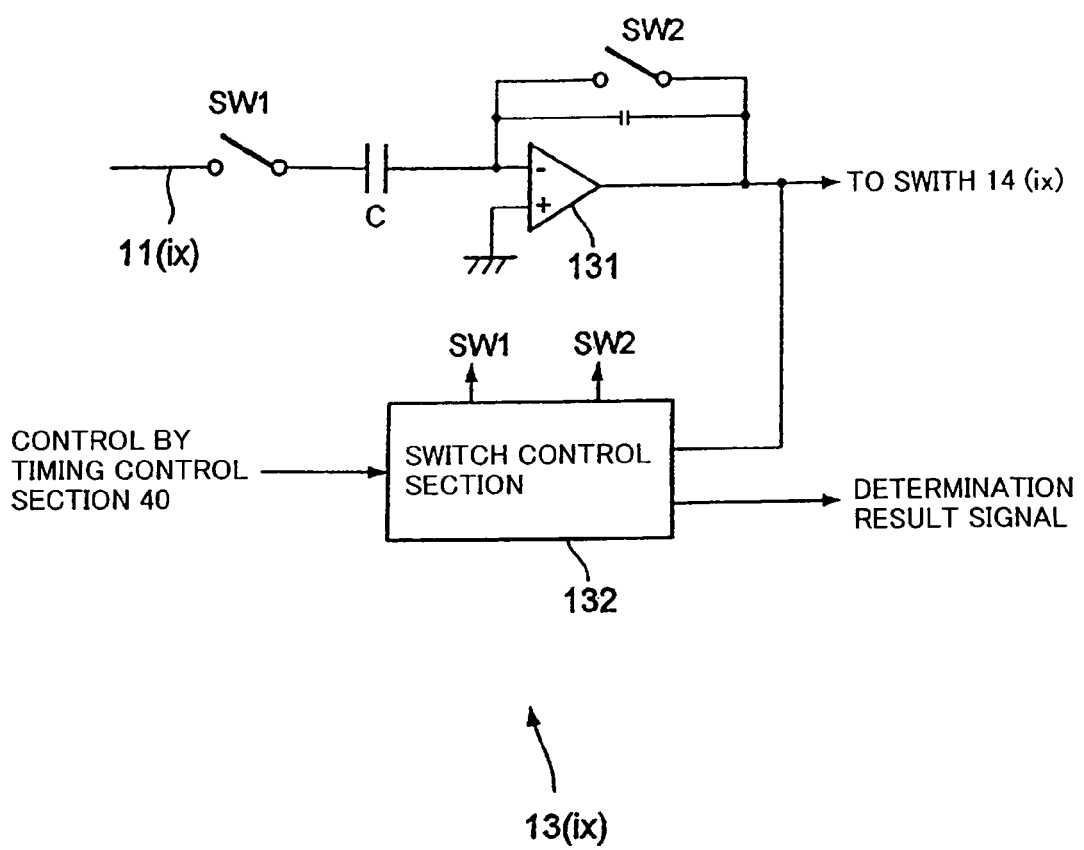
FIG. 13 is a circuit diagram showing an example construction of the CDS circuit that can be suitably employed in each of the first and second wide dynamic range modes.

(5) When the CMOS solid-state image pickup apparatus 1 is to operate in the first or second wide dynamic range mode, each of the CDS circuits 13(ix) (ix=1−m) may be constructed in a manner as shown in FIG. 13. In FIG. 13, a switch SW1 and capacitor C are connected in series between the corresponding column signal line 11(ix) and an inverting input terminal ("=" terminal) of a differential amplifier 131. The differential amplifier 131 has its non-inverting input terminal ("+" terminal) connected to the ground, and a switch SW2 is connected between an output terminal and the inverting input terminal of the differential amplifier 131. The switch SW1, capacitor C, differential amplifier 131 and switch SW2 together constitute a sample-and-hold circuit. Switch control section 132 performs ON/OFF control of the switches SW1 and SW2 on the basis of an instruction signal given from the timing control section 40 and an output signal from the differential amplifier 131, and then outputs a determination result signal.

FIGS. 14A-14F show behavior of the CDS circuit 13(ix) shown in FIG. 13. In each of the first and second wide dynamic range modes, the switch control section 132 turns on the switches SW1 and SW2 as shown in FIG. 14A once a sample-and-hold instruction signal SIG_S/H(1) is generated. In this case, the signal voltage S1 currently output to the column signal line 11(ix) is applied to the capacitor C1 because the inverting input terminal of the differential amplifier 131 is then in a virtual grounded state. After that, the switch control section 132 turns off the switch SW2, so that electric charge charged in the capacitor C loses its discharge path and thus signal charge S1 is retained in the capacitor C.

After that, a reset voltage N1 is output to the column signal line 11(ix), and because this reset voltage N1 is of an opposite polarity from the signal voltage S1 charged in the capacitor C, the differential amplifier 131 outputs an voltage "S1−N1". Once a sample-and-hold instruction signal RES_S/H is generated, the switch control section 132 determines whether the output voltage S1−N1 is greater than (i.e., has exceeded) a predetermined threshold value. If so, the switch control section turns off the switch SW1, as indicated by a dotted line. Thus, the reset voltage N1 is retained in a floating capacitance present between the switch SW1 and the capacitor C, after which the amplifier 131 retains the output voltage S1−N1. In this case, the switch control section 132 outputs to the signal processing section 16 (see FIG. 1) a determination result signal indicating that the differential amplifier 131 has output the voltage S1−N1 as an ultimate pixel signal.

If, on the other hand, the output voltage S1−N1 is not greater than (i.e., has not exceeded) the predetermined threshold value, the switch control section 132 turns on the switches SW1 and SW2 as shown in FIG. 14D. Also, after the reset voltage N1 is charged in the capacitor C, the switch control section 132 turns off the switch SW2 to cause the capacitor C to retain the reset voltage N1 as shown in FIG. 14E.

Then, once a signal voltage S2 is output to the column signal line 11(ix), the differential amplifier 131 outputs an voltage "−(S2−N1)" because this signal voltage S2 is of an opposite polarity from the reset voltage N1 charged in the capacitor C. Once a sample-and-hold instruction signal RES_S/H(2) is generated, the switch control section 132 turns off the switch SW1 as indicated by a dotted line. Thus, the signal voltage S2 is retained in the floating capacitance present between the switch SW1 and the capacitor C, after which the amplifier 131 retains the output voltage −(S2−N1). In this case, the switch control section 132 outputs to the signal processing section 16 a determination result signal indicating that the differential amplifier 131 has output the voltage −(S2−N1) as the ultimate pixel signal. If the determination result signal indicates that the digital pixel signal corresponds to the pixel signal −(S2−N1), the signal processing section 16 may use the digital pixel signal after inverting the polarity of the signal.

(6) In each of the above-mentioned first and second wide dynamic range modes, as described above, once the pixel signal S1−N1 is acquired, a determination is made as to whether the pixel signal S1−N1 has exceeded the predetermined threshold value, and, if so, the pixel signal S1−N1 is set as the ultimate pixel signal. But, if the pixel signal S1−N1 has not exceeded the predetermined threshold value, the further pixel signal S2−N1 is acquired and set as the ultimate pixel signal. Alternatively, however, the ultimate pixel signal may be selected at the digital pixel signal processing stage rather than at the analog pixel signal processing stage. Namely, once the pixel signal S1−N1 is acquired for each of the pixels P(ix) (ix=1−m, iy=1−y), the pixel signal S1−N1 is converted into a digital pixel signal and, for example, stored into a first memory, and then the pixel signal S2−N1 is acquired, converted into a digital pixel signal and, for example, stored into a second memory. Then, in accordance with a determination made for each of the pixels P(ix, iy) as to whether the signal value of the digital pixel signal stored in the first memory is greater than the threshold value, it is determined whether the digital pixel signal stored in the first memory is to be used or the digital pixel signal stored in the second memory is to be used. In this case, the number of times the A/D conversion is to be performed becomes twofold; however, when digital pixel signals (i.e., pixel signals corresponding to the pixel signal S1−N1 and S2−N1) have been acquired under two exposure conditions, an optimal digital pixel signal can be selected through digital signal processing, so that more processing flexibility can be advantageously achieved.

This application is based on, and claims priority to, JP PA 2007-87398 filed on 29 Mar. 2007. The disclosure of the priority application, in its entirety, including the drawings, claims, and the specification thereof, is incorporated herein by reference.

What is claimed is:

1. A CMOS solid-state image pickup apparatus comprising:
a pixel matrix section including a plurality of pixels disposed in row and column arrays;
a pixel signal processing section that processes a pixel signal read out from each of the pixels of said pixel matrix section; and
a timing control section that periodically repeats timing control for reading out the pixel signals of one screen from individual ones of the pixels of said pixel matrix section and that provides a blank period, where no pixel signal is read out, from an end of pixel signal readout of one screen to a start of pixel signal readout of a next screen, said timing control section outputting a control signal for illuminating a light source over a given portion within the blank period,
wherein each of the pixels of said pixel matrix section includes at least a photoelectric conversion element that generates and accumulates therein electric charge corresponding to a received light amount, an electric charge accumulation section, a transfer transistor that transfers electric charge, accumulated in the photoelectric conversion element, to the electric charge accumulation section for accumulation therein, and a reset transistor that resets the electric charge accumulated in the electric charge accumulation section, and
wherein, immediately following start of an illumination period of the light source, said timing control section causes the transfer transistor of each of the pixels of said pixel matrix section to transfer the electric charge, accumulated in the photoelectric conversion element correspondingly thereto, to the electric charge accumulation section so that the electric charge accumulation section of the pixel accumulates therein the electric charge as a result of short-time exposure,
wherein, during a pixel signal readout period, said timing control section not only causes the reset transistor of the pixel, which is an object of pixel signal readout, to reset the electric charge accumulated in the electric charge accumulation section and causes the transfer transistor of the pixel to transfer the electric charge from the photoelectric conversion element to the electric charge accumulation section, but also causes the pixel to output pixel signals corresponding to electric charges, which are accumulated in the electric charge accumulation section at a first time point preceding the reset of the electric charge, a second time point following the reset of the electric charge and preceding the transfer of the electric charge, and a third time point following the transfer of the electric charge, and wherein, if a result of subtraction, from a pixel signal preceding the reset, a pixel signal following the reset and preceding the transfer is greater in value than a predetermined threshold value, said pixel signal processing section sets the result of subtraction as the ultimate pixel signal, but, if the result of subtraction, from the pixel signal preceding the reset, the pixel signal following the reset and preceding the transfer is not greater in value than the predetermined threshold value, said pixel signal processing section sets, as the ultimate pixel signal, a result of subtraction, from a pixel signal following the transfer, of a pixel signal following the reset and preceding the transfer.

2. The CMOS solid-state image pickup apparatus as claimed in claim 1 wherein said timing control section performs the timing control for reading out pixel signals from said pixel matrix section and outputs the control signal for illuminating the light source, by being triggered by a synchronization signal.

3. A CMOS solid-state image pickup apparatus comprising:

a pixel matrix section including a plurality of pixels disposed in row and column arrays;

a pixel signal processing section that processes a pixel signal read out from each of the pixels of said pixel matrix section; and a timing control section that periodically repeats timing control for reading out the pixel signals of one screen from individual ones of the pixels of said pixel matrix section and that provides a blank period, where no pixel signal is read out, from an end of pixel signal readout of one screen to a start of pixel signal readout of a next screen, said timing control section outputting a control signal for illuminating a light source over a given portion within the blank period, wherein each of the pixels of said pixel matrix section includes at least a photoelectric conversion element that generates and accumulates therein electric charge corresponding to a received light amount, an electric charge accumulation section, a transfer transistor that transfers electric charge, accumulated in the photoelectric conversion element, to the electric charge accumulation section for accumulation therein, and a reset transistor that resets the electric charge accumulated in the electric charge accumulation section, wherein, immediately preceding end of an illumination period of the light source, said timing control section causes the reset transistor of each of the pixels of said pixel matrix section to reset the electric charge accumulated in the accumulation section, and then, if there is any electric charge overflowing from the photoelectric conversion element to the electric charge accumulation section before the end of the illumination period of the light source, said timing control section causes the electric charge accumulation section to accumulate therein the overflowing electric charge as a result of short-time exposure, wherein, during a pixel signal readout period, said timing control section not only causes the reset transistor of the pixel, which is an object of pixel signal readout, to reset the electric charge accumulated in the electric charge accumulation section and causes the transfer transistor of the pixel to transfer the electric charge from the photoelectric conversion element to the electric charge accumulation section, but also causes the pixel to output a pixel signal corresponding to electric charges, which are accumulated in the electric charge accumulation section at a first time point preceding the reset of the electric charge, a second time point following the reset of the electric charge and preceding the transfer of the electric charge, and a third time point following the transfer of the electric charge, and wherein, if a result of subtraction, from a pixel signal preceding the reset, a pixel signal following the reset and preceding the transfer is greater in value than a predetermined threshold value, said pixel signal processing section sets the result of subtraction as the ultimate pixel signal, but, if the result of subtraction, from the pixel signal preceding the reset, the pixel signal following the reset and preceding the transfer is not greater in value than the predetermined threshold value, said pixel signal processing section sets, as the ultimate pixel signal, a result of subtraction, from a pixel signal following the transfer, of a pixel signal following the reset and preceding the transfer.

4. The CMOS solid-state image pickup apparatus as claimed in claim 3 wherein said timing control section performs the timing control for reading out pixel signals from said pixel matrix section and outputs the control signal for illuminating the light source, by being triggered by a synchronization signal.

* * * * *